United States Patent [19]
Clark

[11] Patent Number: 5,915,784
[45] Date of Patent: Jun. 29, 1999

[54] ADJUSTABLE SEAT ASSEMBLY

[75] Inventor: Jason Andrew Clark, Vancouver, Canada

[73] Assignee: Syncros Applied Technology Incorporated, Vancouver, Canada

[21] Appl. No.: 08/939,408

[22] Filed: Sep. 29, 1997

[51] Int. Cl.[6] ....................................................... B62J 1/04
[52] U.S. Cl. ................................ 297/215.15; 297/195.1; 297/215.13
[58] Field of Search ........................ 297/215.15, 215.13, 297/195.1; 403/386, 384, 400; 248/188.4, 371

[56] References Cited

U.S. PATENT DOCUMENTS

| | | | |
|---|---|---|---|
| 4,108,407 | 8/1978 | Cable et al. .......................... | 248/188.4 |
| 4,995,753 | 2/1991 | Shook .............................. | 297/215.15 X |
| 5,226,624 | 7/1993 | Kingsberry ......................... | 297/215.15 |
| 5,547,155 | 8/1996 | Herting . | |
| 5,571,273 | 11/1996 | Saarinen .............................. | 297/215.15 |
| 5,722,718 | 3/1998 | Still et al. ........................... | 297/215.15 |

*Primary Examiner*—Peter M. Cuomo
*Assistant Examiner*—Anthony D. Barfield
*Attorney, Agent, or Firm*—C. A. Rowley

[57] ABSTRACT

A seat mounting assembly include a tilt adjustment system wherein the angle of a link on which saddle is mounted may be adjusted via a saddle tilt adjusting mechanism that interconnects base and link members at a position spaced from a moveable connection between the link and base member. The tilt adjusting mechanism is formed by a position adjusting element for adjusting the relative position of the link and base and an independent locking element that unlocks the adjusting mechanism independent of position adjusting element so that the position adjusting element may be then be independently adjusted to adjust the relative position of base and link members from a relative position preset by the adjustment mechanism so that the adjustment commences from the location of the previous adjustment thereby facilitating seat adjustment and accurate repositioning.

19 Claims, 6 Drawing Sheets

ADJUSTABLE SEAT ASSEMBLY

FIELD OF INVENTION

The present invention relates to an adjustable seat assembly, more particularly, the present invention relates to an improved seat tilt adjustment.

BACKGROUND OF THE INVENTION

Seat mounting assemblies which are generally mounted on a seat post on the bicycle are normally provided with some means for clamping the seat to the mounting assembly. These assemblies normally do not provide for seat tilting and when it is, the adjustment is difficult and requires remembering where the seat was and then repositioning the seat as desired.

U.S. Pat. No. 5,547,015 issued Aug. 20, 1996 to Herting describes one such adjusting system wherein to facilitate adjustment, a calibration scale with a plurality of divisions is provided for facilitating precise adjustment of the angle of the seat. Obviously, to use this system, one must release the seat adjusting mechanism, remember its previous position on the scale and then adjust to a selected different position of the scale. This requires the cyclist to be positioned where he can see the scale which is obviously positioned underneath the seat. Thus, he must be off the bicycle and looking up under the seat in order to make a proper adjustment.

In assemblies that permit seat adjustment, releasing the seat for adjustment permits free movement of the seat from its previously adjusted position.

BRIEF DESCRIPTION OF THE PRESENT INVENTION

It is an object of the present invention to provide an improved seat tilting mechanism for a seat mounting assembly.

It is a further object of the present invention to provide a seat tilt adjusting mechanism wherein the adjustment always commences from the previous setting of the tilting.

It is a further object of the invention to provide a seat adjustment wherein separate adjusting and locking actions are required.

Broadly, the present invention relates to a seat mounting assembly comprising a base member, a saddle mounting link member, means moveably connecting said link member to said base member adjacent to one end of said link member, a saddle tilt adjusting mechanism interconnecting said base and said link member at a position spaced from means moveably connecting said link member to said base member, said tilt adjusting mechanism comprising an intermediate position adjusting element for adjusting the relative position of said link and said base members and an independent locking element adjustable between lock and unlock positions wherein said adjusting mechanism is locked or unlocked respectively, said independent locking element being adjustable independent of said intermediate position adjusting element so that said intermediate position adjusting element may be independently adjusted to adjust said relative position of said base and said link members when said independent locking element is in said unlocked position.

Preferably said link member and said adjusting mechanism are mounted so that movement of said locking element to said unlocked position does not disturb said relative position of said base and said link members so that adjustment of said intermediate position adjusting element commences from a relative position preset by the adjustment mechanism.

Preferably said intermediate position adjusting element is a moveable seat against which said link member is locked when said independent locking element is in locking position.

Preferably said a saddle tilt adjusting mechanism further comprises an intermediate tubular element and wherein said moveable seating element said adjustable locking element and said intermediate tubular element are concentric with a longitudinal axis of said adjusting mechanism, said seating element being at an end of said tubular element adjacent to said link member and said adjustable locking element having a shaft means extending through said intermediate tubular element.

Preferably said tilt adjustment mechanism is connected to said base member via said intermediate mounting member.

Preferably a pivotable connection means pivotably connects said adjustable locking element to said link for movement about a rotational axis substantially perpendicular to said longitudinal axis.

Preferably said seating element is mounted on said intermediate mounting element for relative movement between said seating element and said mounting element to adjust the position of said seating element relative to said intermediate mounting element.

Preferably said seating element forms a cap about an end of said of said intermediate element remote from said connection of said intermediate element to said one arm, said cap forming a seat for link and said locking element passing through a aperture in said cap to its said connection with said link.

Preferably said seating element is mounted on said intermediate mounting element for relative movement therebetween to adjust position of said seating element relative to said base via external threads on said mounting element and mating internal threads on said seating element.

Preferably said locking element has an effective length for locking and said effective length is adjusted via a threaded connection between said intermediate element and said locking rod.

Preferably said seating element and said intermediate mounting element are integrally interconnected and said intermediate mounting member is adjustably mounted on said base.

Preferably said intermediate position adjusting element comprises a nut mounted on said base member for rotational movement but restricted movement axial relative to an axis of rotation of said rotational movement.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
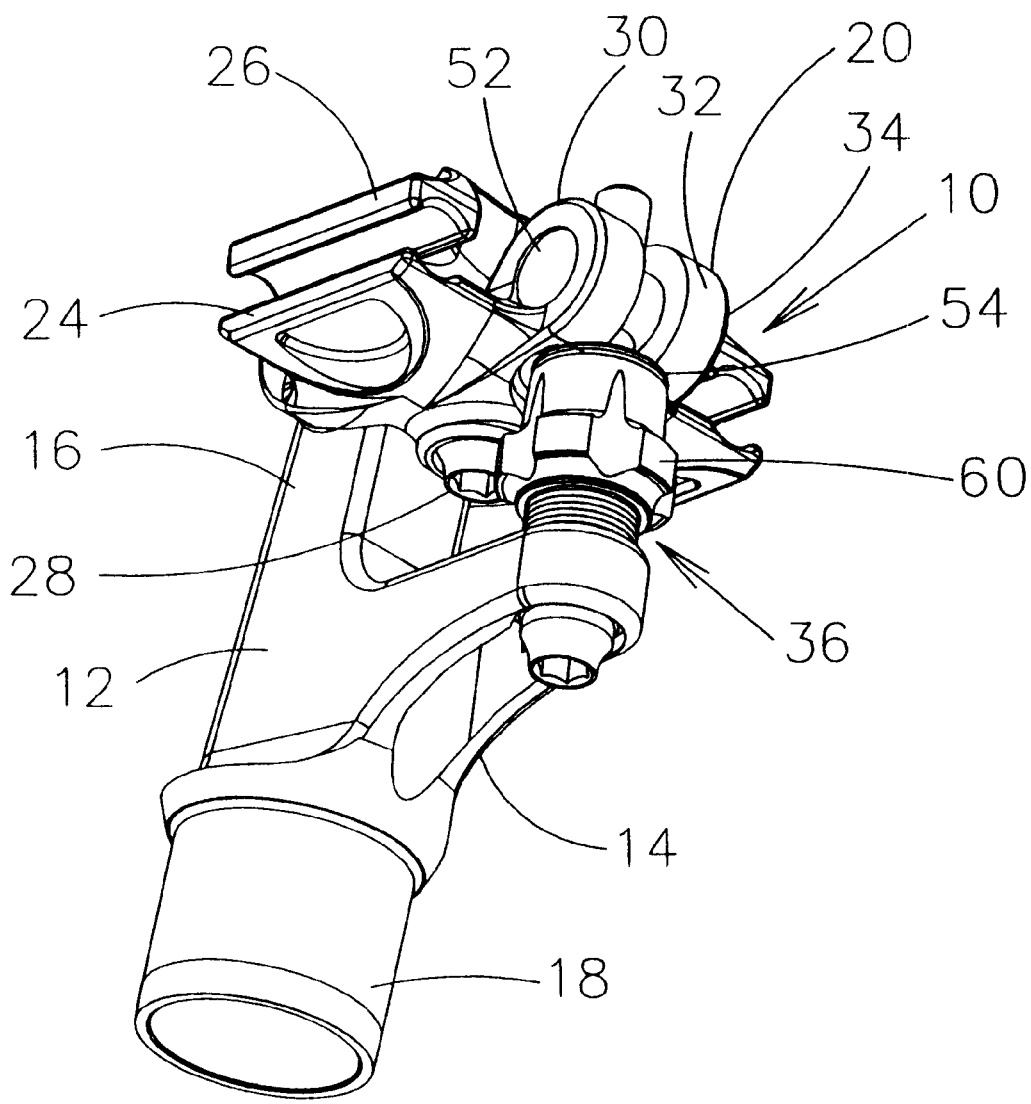
FIG. 1 is an isometric view of one embodiment of the seat mounting assembly.
Figure 2:
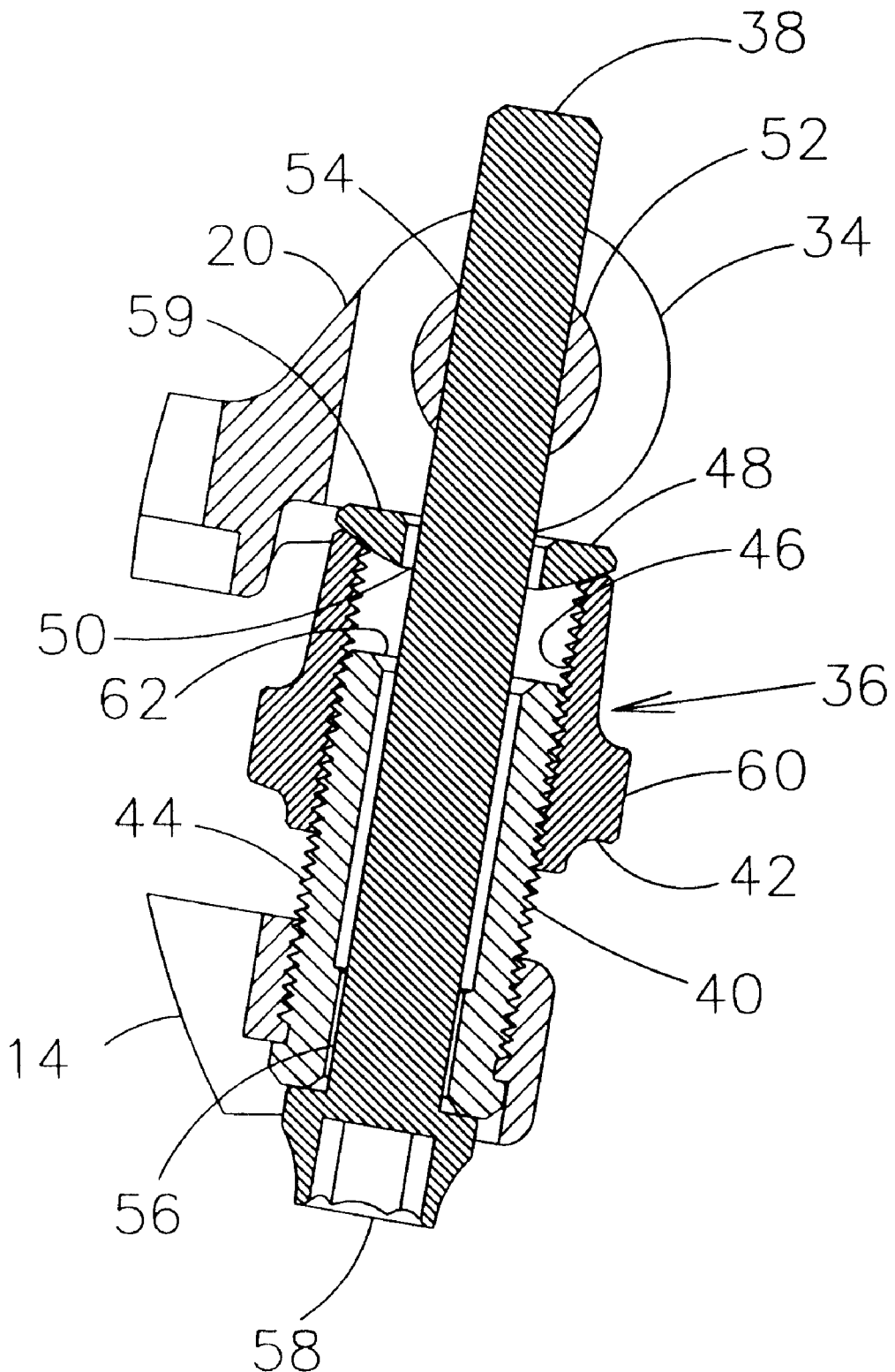
FIG. 2 is a section through the tilt adjusting mechanism of the seat mounting assembly of FIG. 1.

In the embodiment shown in FIG. 1, the seat assembly 10 comprises a base member 12 that is substantially L-shaped and has a first arm 14 and a second or other arm 16 extending upwardly therefrom, i.e. the arm 14 will normally be substantially horizontal and the arm 16 substantially vertical when mounted on cycle in the conventional manner via for example, the tubular element as indicated at 18 and extensions thereof.

The seat mounting assembly 10 of FIG. 1 further comprises a link 20 pivotably connected to the arm 16 as indicated by the shaft 22 (see FIGS. 3, 4 and 5) and mounting a conventional seat or saddle clamping system comprising a bottom clamping member 24 fixed to the link 20 and a top clamping member 26 the position of which relative to the bottom clamping member 24 is adjusted via the bolt 28 to clamp a saddle or seat (not shown) thereon.

In the illustrated arrangement. the link 20 is composed of a pair of link elements 30 and 32 position one on each side of the arm 16 and coupled together via the mounting shaft 22 (and 52 to be described below) and the bottom clamp element 24.

The free end of the link 20, i.e. end remote from the pivotal connection 22 as indicated at 34 is connected to the tilt adjusting mechanism 36 in a manner that will be described hereinbelow.

The tilt adjusting mechanism 36 is composed of three concentric elements namely, central locking element 38 and intermediate mounting element 40 and a seating element 42.

The intermediate element 40 is fixed to the arm 14, for example, via threads 44 on its outer surface. These threads also extend to cooperate with inner threads 46 on the seating element 42 for adjustment of the relative position of the seating element 42 to the intermediate element 40 by rotation of the seating element 42, and the resulting interaction between the threads 44 and 46.

The seating element 42 is preferably provided with an end cap forming a seat 48 against which the link 20 seats to position the link 20 and thereby a bicycle or the like seat (not shown) connected thereto.

The end 48 has a central aperture 50 through which the rod i.e. locking element 38 passes.

In the illustrated arrangement, a mounting shaft 52 having a longitudinal axis substantially parallel to the shaft 22 is pivotally mounted in the link 20 adjacent to the free end 34 and is provided with an aperture 54 through which the rod 38 passes and which preferably is provided with threads that cooperate with corresponding threads on the locking rod element 38 to adjust the effective length of the locking element 38 to move the shaft 52 axially along the rod element 38 and thus permit locking of the assembly.

If desired, the rod element 38 maybe fixed to the shaft 52 and a threaded connection schematically indicated it 56 be provided between the rod 38 and the intermediate element 40 so that the effective length of the rod element 38 may be adjusted by moving the rod element 38 axially relative to the element 40. However, it is preferred to have the thread connection between the rod element 38 and the shaft 52 in which case the threads 56 will not be present and the rod 38 will be free to rotate in the element 40.

The adjustment of the tilted angle is accomplished as follows. In the illustrated arrangement, a locking key may be inserted into the key hole 58 to rotate the rod element 38 and thereby relieve the pressure between the seat 48 and the adjacent seat forming portion 59 of the link 20. The seating element 42 is then turned via the hand grip portions 60 to adjust the amount of extension of the cap 48 from the free end 62 of the mounting element 40 and when the desired position of the seat is obtained, the rod element 38 is again rotated to move the link 20 against the seat 48 and to firmly clamp the link 20 in this position.

Figure 3:
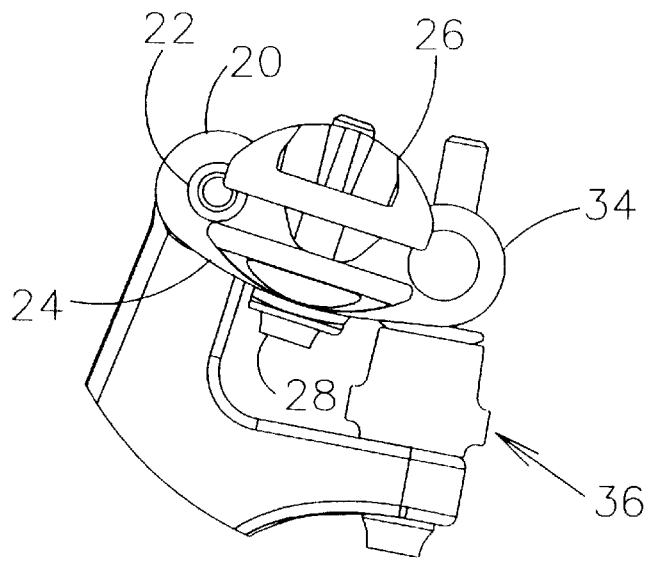
FIGS. 3, 4 and 5 are side elevations of the assembly of FIG. 1 showing the tilt adjustment in different positions.
Figure 4:
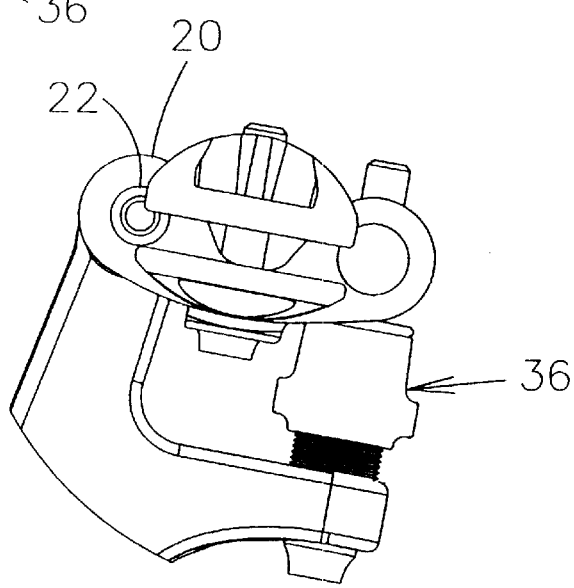
Figure 5:
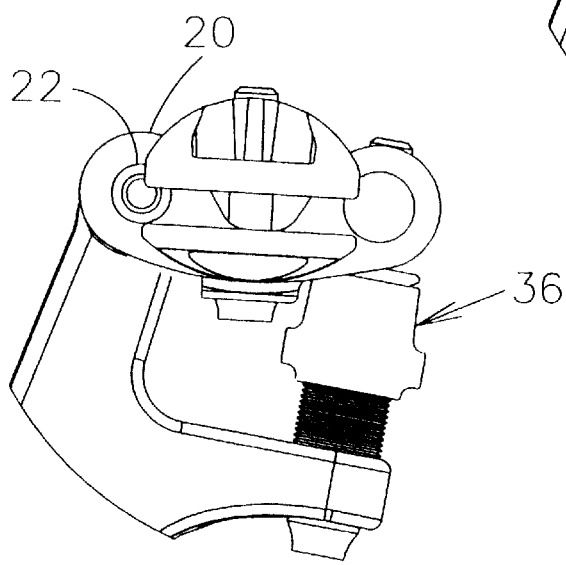

In the illustrations in FIGS. 3, 4 and 5, the adjusting mechanism 36 is shown in its lowest most position, its intermediate position and its uppermost position respectively. These positions are also attainable with the embodiments of FIGS. 6 to 9 inclusive.

Figure 6:
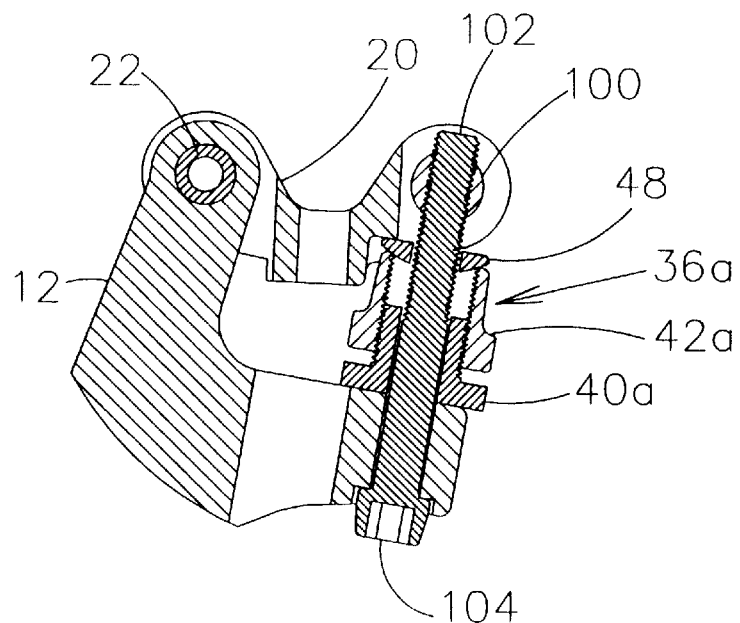
FIG. 6 illustrates the modification of the embodiment of the invention shown in FIG. 1.

As shown in FIG. 6, the link member 20 has a shaft 100 to which is connected a locking rod 102 that has a bolt or the like 104 that is used to pull the link 20 against the seat 48 of the of the adjusting mechanism 36A. The mechanism 36A has a seating element 42A which as in the previous embodiment is mounted on the intermediate threaded member 40A, however the member 40A is not threaded to the post 12, but is clamped thereagainst by the locking rod 102 when it is in locking position clamping the elements together.

Figure 7:
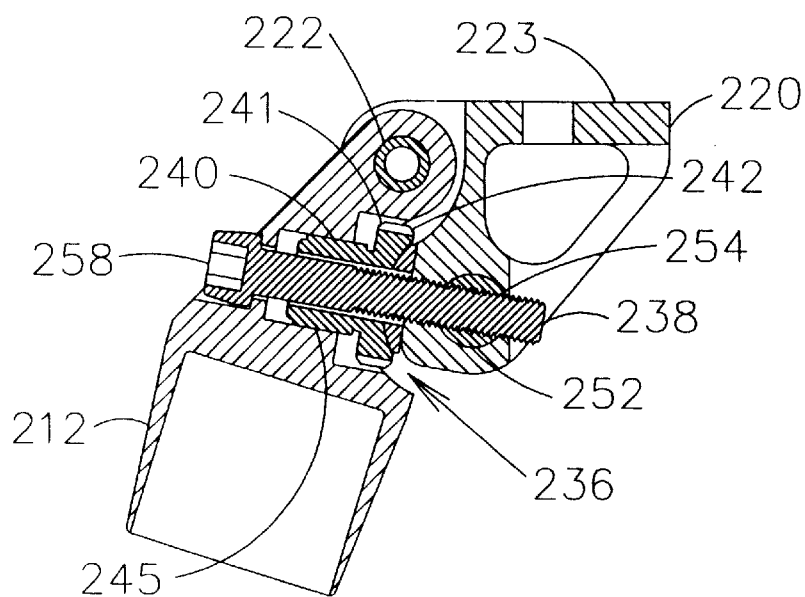
FIG. 7 shows a preferred embodiment of the invention.
Figure 8:
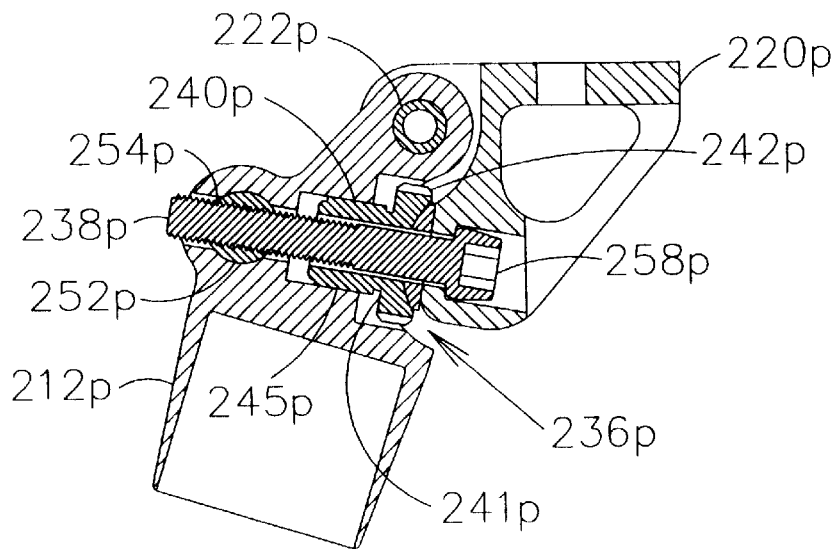
FIG. 8 shows an alternative form of the preferred embodiment of the invention shown in FIG. 7.

FIGS. 7 and 8 show two forms of the preferred embodiment of the invention and uses for equivalent elements the same reference numerals as in FIGS. 1 to 5 but in the 200 in FIG. 7 and the 200 series followed by a P in FIG. 8.

Referring to FIG. 7 the post 212 is a substantially straight post as opposed to the L shaped post 12 of the FIG. 1 to 5 embodiment. A pin 222 pivotally couples the link 220 which has a substantially shape and may be composed of a pair of spaced mirror elements coupled together by the seat mounting flange 223 to which the seat mounting clamps may be connected or may be made from a single piece.

The tilt adjusting mechanism 236 is composed of a locking element 238 and a combined intermediate element 241 formed from an intermediate element 240 and seat 242 which are integrally interconnected. The intermediate element 241 at its end remote from the seat 242 is threadedly connected to the post 212 as indicated at 245.

The locking element 238 is in the form of a rod that is threadedly connected as indicated at 254 to a shaft 252 having an axis parallel to the that of the shaft 222 and perpendicular to the longitudinal axis of the adjustment mechanism 236. A wrench receiving socket 258 is provided at the end of the element 238 remote from the link 220.

In the FIG. 8 embodiment the locking element 238P has been reversed so that the socket 258P is adjacent to the link 220P and the shaft 252P equivalent to the shaft 252 and to which the element 238P is threadedly connected as indicated at 254P is mounted on the post 212P, i.e. the positions of the socket 258 and the shaft 252 are reversed in FIG. 8.

The operation of the FIG. 7 and 8 embodiments is essentially the same as the other embodiments in that the locking element 238 (238P) is first released and then the position of the seat 242 (242P) is adjusted by screwing the element 241 (241P) into or out of the post 212 (212P) and tightening the locking element 238 (238P) to lock the adjusting mechanism 236 (236P) in adjusted position, thereby locking the seat (not shown) in adjusted position.

Figure 9:
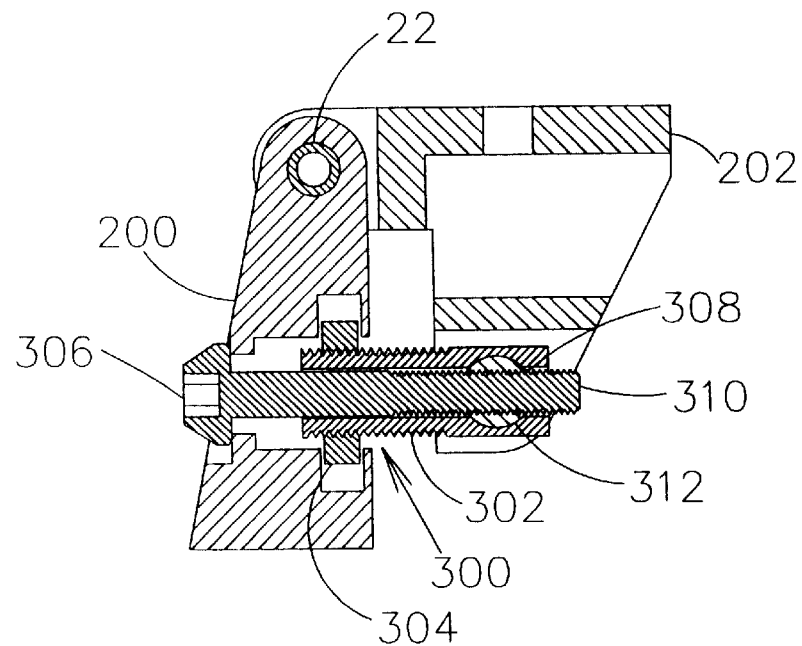
FIG. 9 is an embodiment illustrating a modified adjustment mechanism.

FIG. 9 shows a modified adjustment mechanism 300 to replace the adjustment mechanism 36, 36A or 236. The significant difference between this device and the previous devices is the seat is formed on a threaded member or sleeve 302 which is threaded through a trapped nut 304 that may be rotated, but is inhibited from movement axially of the axis of rotation of the nut 304. The sides of the nut 304 are exposed through the sides of the post 200 so that the nut 304 may be gripped on opposite sides and manipulated.

The locking mechanism 300 of FIG. 9 includes a rod 310 which clamps the lever 202 against a seat 308 formed between the outside of the shaft 312 and a hole in the in the shaft 302 through which the shaft 312 passes i.e. the shafts 302 and 312 are mutually perpendicular. The rod 310 is formed with a bolt or socket end 306 to adjust the effective length of the locking rod 310 via its threaded connection with the shaft 312 (equivalent to the shaft 52). When the nut 304 is turned to axially move the sleeve 302 and thereby repositioned the seat 308. After the adjustment is completed, the rod 10 is again tightened to lock everything into position.

Figure 10:
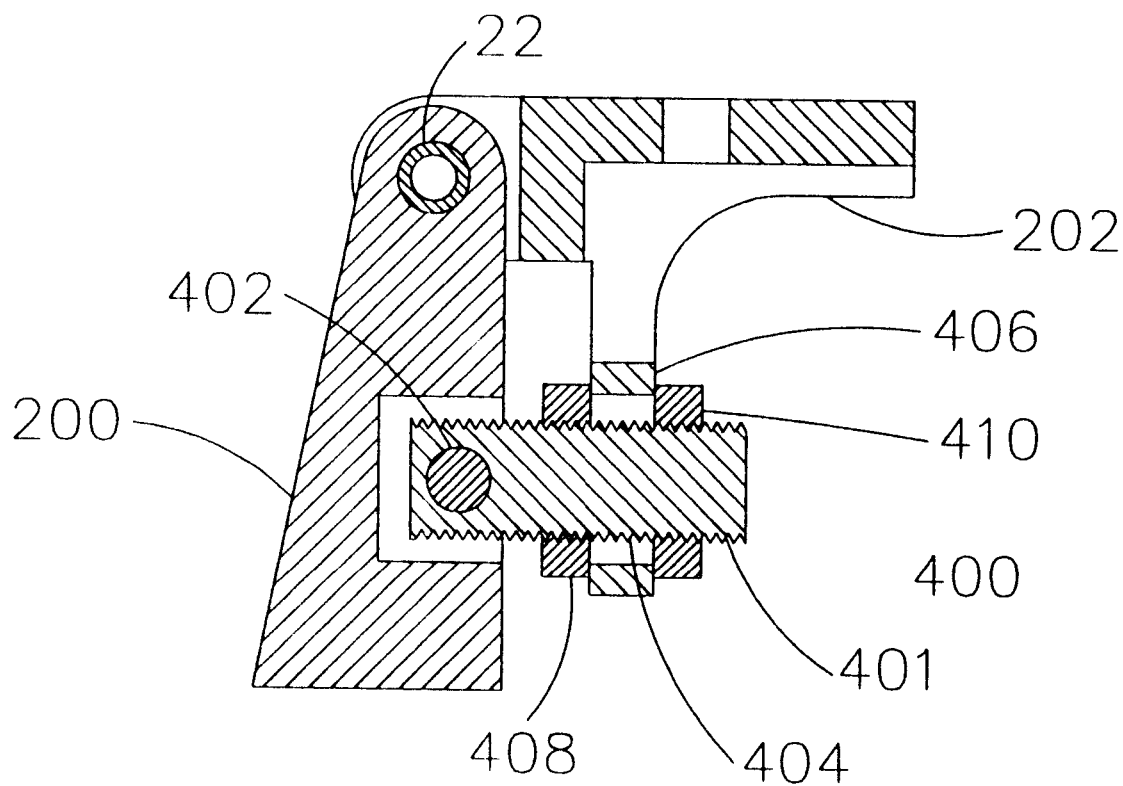
FIG. 10 is yet another version of adjustment mechanism.

In the FIG. 10 embodiment, the locking mechanism 400 includes a stud 401 which is pivotably mounted indicated at 402 on the base or post 200 on a pivot substantially parallel to the pivot 22 so that it may properly align with a hole 404 formed on the lower arm 406 of the link 202. The stud 401 passes through the aperture 404 in the link 202 and is provided with a first nut 408, positioned between the post 200 and the arm section 406 of the link 202 and a second nut 410 on the side of the arm 406 remote from the post 200. To operate this system, the nut 410 is loosen and the nut 408 is turned to adjust the position of the seating of the arm section 406 on the nut 408 and then the nut 410 is again tightened.

The embodiment of FIG. 10 locks the seat in position but does not take the play out of the shaft connection 402 of the stud 401 to the post 200 and thus, it is preferred to use one of the earlier described embodiments.

Obviously, the different adjusting mechanisms described above with suitable modifications may be used with either the post or base 12 or 200 or 212.

It will be apparent that with the present invention, when the locking rod element is released, the position of the link is still in the previous adjustment position and is simply a matter of adjusting the adjustment mechanism for the required change for example by rotating the seating element 42, a selected number of turns to move the seating element relative to the mounting element 40 in the appropriate direction by the appropriate amount. Obviously, one need not be positioned under the bicycle to view the degree of adjustment and once one becomes familiar with the amount of adjustment per turn, it is simply a matter of counting the number of say, quarter turns desired to change the tilt angle appropriately.

The locking elements have been shown to be operated by a key or wrench or the like. However, they can be provided with a hand knob as the pressure required to lock does not have to be excessive.

Having described the invention, modifications will be evident to those skilled in the art without departing from the scope of the invention as defined in the appended claims.

I claim:

1. A seat mounting assembly comprising a base member, a saddle mounting link member, a shaft mounted on said base member and pivotably connecting said link member to said base member adjacent to one end of said link member, a saddle tilt adjusting mechanism interconnecting said base and said link member at a position spaced from said shaft pivotably connecting said link member to said base member, said tilt adjusting mechanism comprising an intermediate position adjusting means cooperating with said link member for adjusting the relative position of said link and said base members by pivoting said link member relative to said base about said shaft and an independent locking means, said intermediate position adjusting means and said independent locking means being concentric, and said independent locking means is adjustable independent of said intermediate position adjusting means between lock and unlock positions wherein said adjusting mechanism is locked or unlocked respectively so that said intermediate position adjusting means may be independently adjusted to adjust said relative position of said base and said link members when said independent locking means is in said unlocked position and movement of said independent locking means to said unlocked position does not disturb said relative position of said base and said link members so that adjustment of said intermediate position adjusting means commences from a relative position preset by said adjustment mechanism.

2. A seat mounting assembly as defined in claim 1 wherein said intermediate position adjusting means is a moveable seating element against which said link member is locked when said independent locking means is in locking position.

3. A seat mounting assembly as defined in claim 2 wherein said saddle tilt adjusting mechanism further comprises an intermediate tubular element and wherein said moveable seating element, said adjustable locking means and said intermediate tubular element are concentric with a longitudinal axis of said adjusting mechanism, said seating element being at an end of said intermediate tubular element adjacent to said link member and said adjustable locking means includes a shaft means extending through said intermediate tubular element.

4. A seat mounting assembly as defined in claim 3 wherein said tilt adjustment mechanism is connected to said base member via said intermediate tubular element.

5. A seat mounting assembly as defined in claim 4 wherein said intermediate tubular element and said seating element are integrally connected.

6. A seat mounting assembly as defined in claim 5 wherein said tilt adjustment mechanism is connected to said base member by a threaded connection permitting axial movement of said intermediate tubular element relative to said base member.

7. A seat mounting assembly as defined in claim 6 wherein pivotable connection means pivotably connects said adjustable locking means to said link for movement about a rotational axis substantially perpendicular to said longitudinal axis.

8. A seat mounting assembly as defined in claim 7 wherein said seating element is provided with a seat forming cap about an end of said of said intermediate tubular element remote from said connection of said intermediate tubular element to said base, said seat forming cap forming a seat for said link and said locking element passing through a aperture in said seat forming cap.

9. A seat mounting assembly as defined in claim 7 wherein said locking means has an effective length for locking and said effective length is adjusted by a threaded connection between said pivotable connection means and said locking means.

10. A seat mounting assembly as defined in claim 6 wherein pivotable connection means pivotably connects said adjustable locking means to said base member for movement about a rotational axis substantially perpendicular to said longitudinal axis.

11. A seat mounting assembly as defined in claim 10 wherein said locking means has an effective length for locking and said effective length is adjusted by a threaded connection between said pivotable connection means and said locking means.

12. A seat mounting assembly as defined in claim 10 wherein said seating element is provided with a seat forming cap about an end of said of said intermediate tubular element remote from said connection of said intermediate tubular element to said base, said seat forming cap forming a seat for said link and said locking element passing through a aperture in said seat forming cap.

13. A seat mounting assembly as defined in claim 5 wherein said intermediate position adjusting means comprises a nut mounted on said base member in a manner to permit rotational movement of said nut around a rotational axis while restricting axial movement of said nut relative to said axis of rotation.

14. A seat mounting assembly as defined in claim 4 wherein said seating element is mounted on said intermediate tubular element for relative movement between said seating element and said intermediate tubular element to adjust the position of said seating element relative to said intermediate tubular element.

15. A. seat mounting assembly as defined in claim 3 wherein said intermediate tubular element and said seating element are integrally connected.

16. A seat mounting assembly as defined in claim 3 wherein said seating element is mounted on said intermediate tubular element for relative movement between said seating element and said intermediate tubular element to adjust the position of said seating element relative to said intermediate tubular element.

17. A seat mounting assembly as defined in claim 3 wherein said locking means has an effective length for locking and said effective length is adjusted via a threaded connection between said intermediate tubular element and said locking shaft means.

18. A seat mounting assembly as defined in claim 2 wherein said intermediate position adjusting means comprises a nut mounted on said base member in a manner to permit rotational movement of said nut around a rotational axis while restricting axial movement of said nut relative to said axis of rotation.

19. A seat mounting assembly as defined in claim 7 wherein said intermediate position adjusting means comprises a nut mounted on said base member in a manner to permit rotational movement of said nut around a rotational axis while restricting axial movement of said nut relative to said axis of rotation.

* * * * *